US012699014B2

(12) United States Patent
Jin et al.

(10) Patent No.: US 12,699,014 B2
(45) Date of Patent: Aug. 4, 2026

(54) FLEXIBLE PRESSURE SENSOR

(71) Applicants: ELECTRONICS AND TELECOMMUNICATIONS RESEARCH INSTITUTE, Daejeon (KR); Korea Advanced Institute of Science and Technology, Daejeon (KR)

(72) Inventors: Hanbit Jin, Daejeon (KR); Steve Park, Daejeon (KR); Hye Jin Kim, Daejeon (KR); Seyoung Kwon, Daejeon (KR); Gyeongsuk Park, Daejeon (KR); Wooseup Youm, Daejeon (KR)

(73) Assignees: ELECTRONICS AND TELECOMMUNICATIONS RESEARCH INSTITUTE, Daejeon (KR); Korea Advanced Institute of Science and Technology, Daejeon (KR)

( * ) Notice: Subject to any disclaimer, the term of this patent is extended or adjusted under 35 U.S.C. 154(b) by 414 days.

(21) Appl. No.: 18/347,163

(22) Filed: Jul. 5, 2023

(65) Prior Publication Data

US 2024/0011850 A1      Jan. 11, 2024

(30) Foreign Application Priority Data

Jul. 6, 2022      (KR) ......................... 10-2022-0083237
Oct. 26, 2022     (KR) ......................... 10-2022-0139367

(51) Int. Cl.
*G01L 1/18*          (2006.01)
*G01L 1/20*          (2006.01)

(52) U.S. Cl.
CPC ................ *G01L 1/18* (2013.01); *G01L 1/205* (2013.01)

(58) Field of Classification Search
CPC .................................. G01L 1/18; G01L 1/205
(Continued)

(56) References Cited

U.S. PATENT DOCUMENTS

2002/0092361 A1    7/2002   Penzar et al.
2011/0011650 A1*   1/2011   Klinghult ............. H01H 13/803
                                                   178/18.03
(Continued)

FOREIGN PATENT DOCUMENTS

CN        106813811 A   *   6/2017   ............. G01L 1/148
CN        108896215 A   *  11/2018   ............... G01L 9/06
(Continued)

OTHER PUBLICATIONS

Translation_CN106813811 (Year: 2017).*
(Continued)

*Primary Examiner* — Peter J Macchiarolo
*Assistant Examiner* — Monica S Young

(57)          ABSTRACT

Provided is a flexible pressure sensor. The flexible pressure includes: a lower structure; and an upper structure on the lower structure, wherein the lower structure includes: a flexible substrate; and first electrodes on the flexible substrate and second electrode spaced apart from the first electrodes, and the upper structure includes: a support; first protrusion structures integrally connected to the support to protrude from a bottom surface of the support; and second protrusion structures integrally connected to the support to protrude from the bottom surface of the support, the second protrusion structures being spaced apart from the first protrusion structures, wherein the first protrusion structures are in contact with a top surface of the flexible substrate, the second protrusion structures are vertically spaced apart from the first and second electrodes, and when viewed in a plan view, the first protrusion structures are configured to completely surround the second protrusion structures.

17 Claims, 9 Drawing Sheets

(58) Field of Classification Search
USPC .................................................. 73/862.621
See application file for complete search history.

(56) References Cited

U.S. PATENT DOCUMENTS

| | | | | |
|---|---|---|---|---|
| 2015/0277646 A1* | 10/2015 | Ogura | ................. | G06F 3/04144 |
| | | | | 345/173 |
| 2018/0246000 A1 | 8/2018 | Kim et al. | | |
| 2020/0025635 A1* | 1/2020 | Kim | .......................... | G01L 1/24 |
| 2022/0390305 A1* | 12/2022 | Ishizaki | .................. | G01L 5/162 |

FOREIGN PATENT DOCUMENTS

| | | | | | | |
|---|---|---|---|---|---|---|
| CN | 109540354 A | * | 3/2019 | .......... | G01L 1/2293 |
| CN | 111060238 A | | 4/2020 | | |
| CN | 111537115 A | * | 8/2020 | .............. | G01L 1/18 |
| CN | 113711000 A | * | 11/2021 | .......... | G01L 1/2287 |
| CN | 113970394 A | | 1/2022 | | |
| CN | 114354030 A | | 4/2022 | | |
| CN | 118999851 A | * | 11/2024 | .......... | G01L 1/2206 |
| GB | 2584088 A | * | 11/2020 | ............ | G01L 1/005 |
| JP | 2001208623 A | * | 8/2001 | | |
| KR | 10-2002-0022619 A | | 3/2002 | | |
| KR | 102040887 B1 | * | 11/2019 | ............ | G01L 1/005 |
| KR | 102360933 B1 | * | 2/2022 | ............ | G01L 5/161 |
| WO | WO-2020047786 A1 | * | 3/2020 | .............. | G01L 1/18 |

OTHER PUBLICATIONS

Translation_CN114354030 (Year: 2022).*
Translation_WO2020047786 (Year: 2020).*
KR_102040887 (Year: 2019).*
Hanul Moon, "Development of High Performance Capacitive Flexible Pressure Sensors", Polymer Science and Technology, Aug. 2021, vol. 32, No. 4.

\* cited by examiner

FLEXIBLE PRESSURE SENSOR

CROSS-REFERENCE TO RELATED APPLICATIONS

This U.S. non-provisional patent application claims priority under 35 U.S.C. § 119 of Korean Patent Application Nos. 10-2022-0083237, filed on Jul. 6, 2022, and 10-2022-0139367, filed on Oct. 26, 2022, the entire contents of which are hereby incorporated by reference.

BACKGROUND

The present disclosure herein relates to a flexible pressure sensor. Particularly, the present disclosure relates to a flexible pressure sensor capable of preventing pressure sensing due to bending and selectively sensing only a pressure due to contact.

A flexible pressure sensor is widely applied in various devices such as smart windows, displays, security systems, mobile phones, and e-skins. In addition, the flexible pressure sensor is causing great interest as an application device for Internet of Things (IoT) applications and robot applications.

Particularly, in wearable devices and robot applications, a flexible pressure sensor capable of precisely measuring a pressure on a curved or moving surface is required. Therefore, research is being actively conducted to develop a flexible pressure sensor capable of accurately measuring only a contact pressure while excluding cross talk due to bending or stretching on the curved surface or moving surface.

SUMMARY

The present disclosure provides a flexible pressure sensor capable of preventing pressure sensing due to bending, but selectively sensing only a pressure due to contact, and a method for manufacturing the same.

An embodiment of the inventive concept provides a flexible pressure sensor including: a lower structure; and an upper structure on the lower structure, wherein the lower structure includes: a flexible substrate; and first electrodes on the flexible substrate and second electrode spaced apart from the first electrodes, and the upper structure includes: a support; first protrusion structures integrally connected to the support to protrude from a bottom surface of the support; and second protrusion structures integrally connected to the support to protrude from the bottom surface of the support, the second protrusion structures being spaced apart from the first protrusion structures, wherein the first protrusion structures are in contact with a top surface of the flexible substrate, the second protrusion structures are vertically spaced apart from the first and second electrodes, and when viewed in a plan view, the first protrusion structures are configured to completely surround the second protrusion structures.

In an embodiment, each of the first protrusion structures may have a first height, and each of the second protrusion structures may have a second height, wherein the first height may be greater than the second height.

In an embodiment, the first height may be about 1.8 times to about 2.2 times the second height.

In an embodiment, each of the first protrusion structures and each of the second protrusion structures may include pores, respectively.

In an embodiment, the support does may not include the pores.

In an embodiment, a top surface of each of the first protrusion structures may have a first width in a first direction, which is parallel to the top surface of the flexible substrate, a bottom surface of each of the first protrusion structures may have a second width in the first direction, and a top surface of each of the second protrusion structures may have a third width in the first direction, wherein the first width may be greater than each of the second width and the third width.

In an embodiment, a width of each of the first protrusion structures in the first direction may decrease constantly from the top surface to the bottom surface of each of the first protrusion structures.

In an embodiment, a lower end of each of the second protrusion structures may have a pointed shape.

In an embodiment, the flexible pressure sensor may further include first line connected to the first electrodes and second lines separately connected to each of the second electrodes, wherein a ground voltage may be applied to the first line, and a voltage that is different in magnitude from the ground voltage may be applied to the second lines.

In an embodiment, when viewed in a plan view, the first electrodes and the second electrodes may have a concentric circle shape.

In an embodiment, the flexible pressure sensor may further include a conductive film configured to cover the bottom surface of the support, the first protrusion structures, and the second protrusion structures, wherein the conductive film may be in contact with the flexible substrate on a region that vertically overlaps the first protrusion structures, and the conductive film may be vertically spaced apart from the first and second electrodes on a region that vertically overlaps the second protrusion structures.

In an embodiment of the inventive concept, a flexible pressure sensor includes: a lower structure; and an upper structure on the lower structure, wherein the lower structure includes: a flexible substrate; and first electrodes on the flexible substrate and second electrode spaced apart from the first electrodes, and the upper structure includes: a support; first protrusion structures protruding from a bottom surface of the support; and second protrusion structures protruding from the bottom surface of the support, the second protrusion structures being spaced apart from the first protrusion structures, wherein each of the first protrusion structures has a first width in a first direction parallel to a top surface of the flexible substrate, each of the second protrusion structures has a second width in the first direction, the bottom surface of the support and a side surface of each of the first protrusion structures are angled at a first angle, and the bottom surface of the support and a side surface of each of the second protrusion structures are angled at a second angle, wherein the first width is greater than the second width, and the first angle and the second angle are the same. In an embodiment, when viewed in a cross-sectional view, each of the first protrusion structures may have a trapezoidal shape, and when viewed in a cross-sectional view, each of the second protrusion structures may have a triangular shape.

In an embodiment, the second protrusion structures may vertically overlap the first and second electrodes, the first protrusion structures may be in contact with the top surface of the flexible substrate, and the second protrusion structures may be vertically spaced apart from the first and second electrodes.

In an embodiment, each of the first angle and the second angle may range of about 52 degrees to about 57 degrees.

In an embodiment, each of the first protrusion structures may have a first height, and each of the second protrusion structures may have a second height, wherein the first height may be 1.8 times to 2.2 times the second height.

In an embodiment, the first protrusion structures may be configured to completely surround the second protrusion structures, and the second protrusion structures may be arranged in a zigzag shape in the first direction.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Preferred embodiments of the inventive concept will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims. In the accompanying drawings, the components are shown enlarged for the sake of convenience of explanation, and the proportions of the components may be exaggerated or reduced for clarity of illustration.

Hereinafter, a flexible pressure sensor and a method for manufacturing the same according to an embodiment of the inventive concept will be described in detail with reference to the drawings.

Figure 1A:
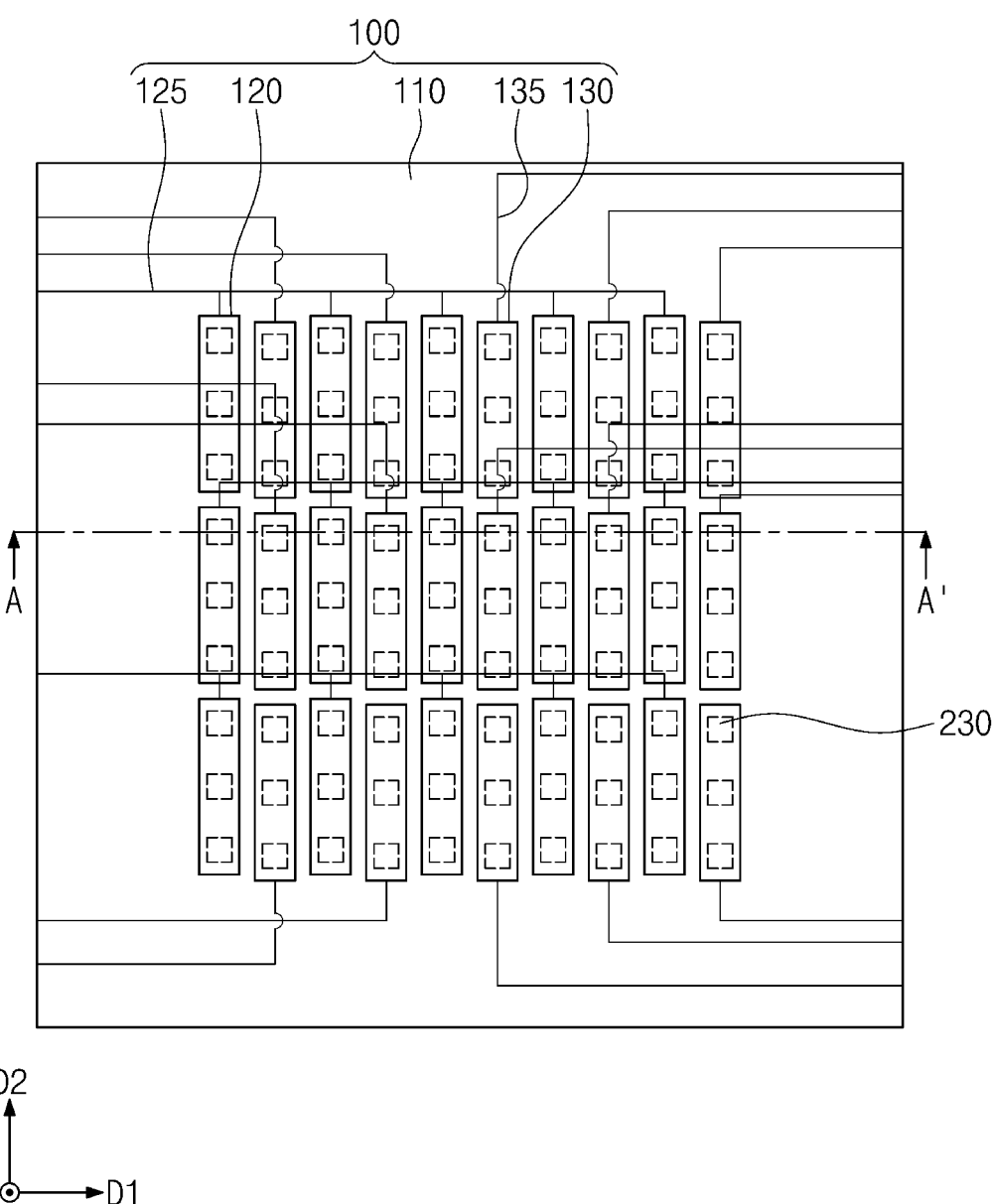
FIG. 1A is a plan view illustrating a lower structure of a flexible pressure sensor according to an embodiment of the inventive concept.
Figure 1B:
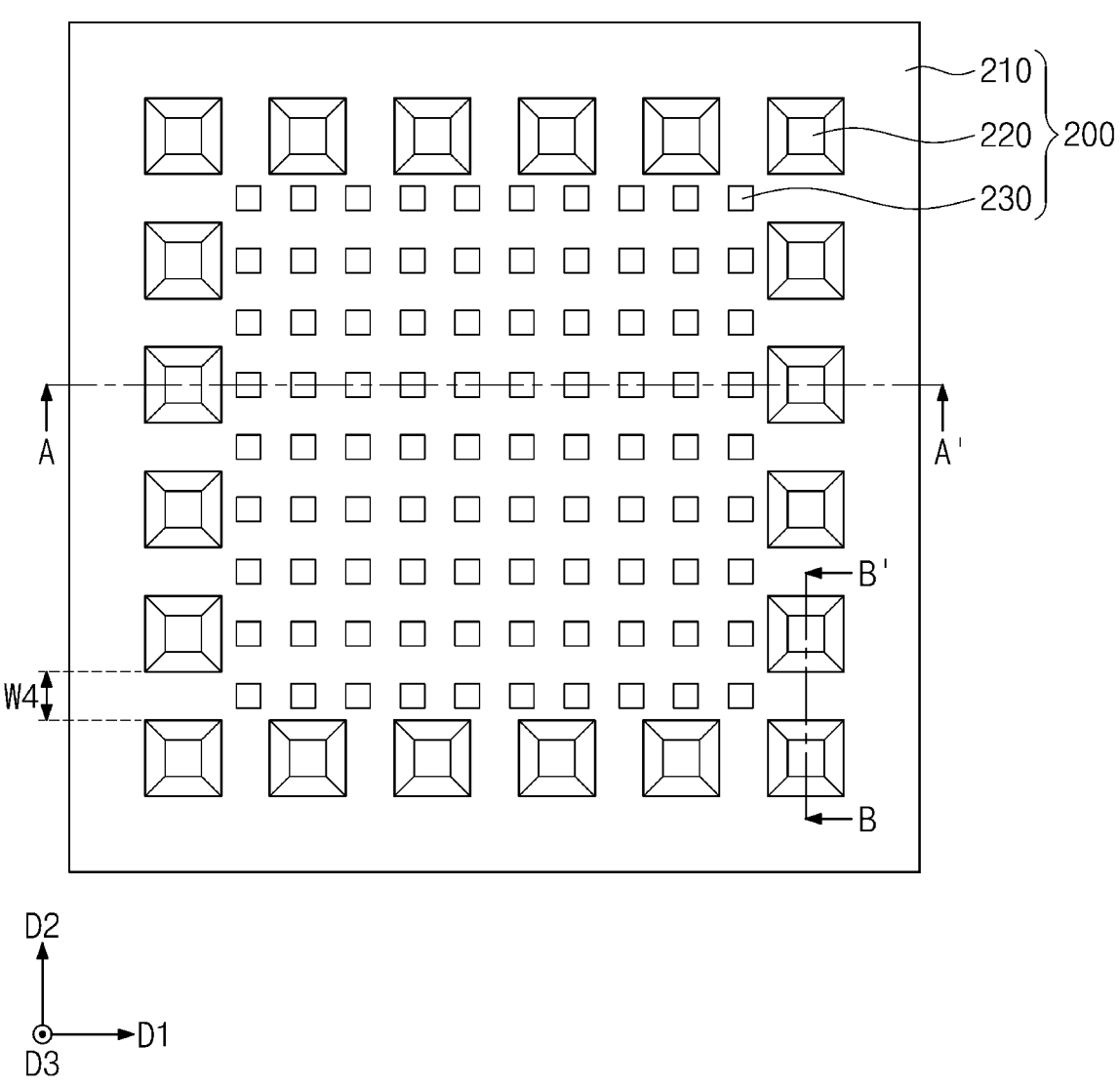
FIG. 1B is a plan view illustrating an upper structure of the flexible pressure sensor according to an embodiment of the inventive concept.
Figure 2:
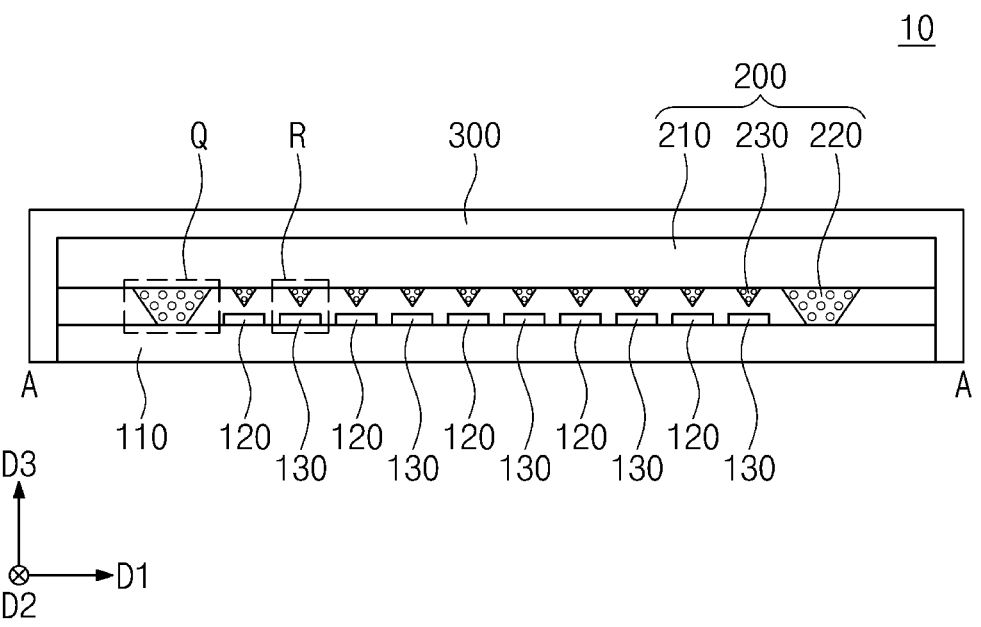
FIG. 2 is a cross-sectional view for explaining the flexible pressure sensor according to an embodiment of the inventive concept, which corresponds to a cross-section taken along line A-A' of FIGS. 1A and 1B.

FIG. 1A is a plan view illustrating a lower structure of a flexible pressure sensor according to an embodiment of the inventive concept. FIG. 1B is a plan view illustrating an upper structure of the flexible pressure sensor according to an embodiment of the inventive concept. FIG. 2 is a cross-sectional view for explaining the flexible pressure sensor according to an embodiment of the inventive concept, which corresponds to a cross-section taken along line A-A' of FIGS. 1A and 1B.

Referring to FIGS. 1A, 1B, and 2, a flexible pressure sensor 10 may include a lower structure 100, an upper structure 100 on the lower structure 100, and a protective film covering the lower structure 100 and the upper structure 200.

Referring to FIGS. 1A and 2, the lower structure 100 may include a flexible substrate 110, a first electrode 120, a second electrode 130, a first line 125 and a second line 135. The flexible substrate 110 may have a thickness of about 1 μm to about 150 μm. The flexible substrate 110 may include a conductive material having good mechanical strength and elasticity such as a carbon electrode, a porous metal, or a conductive polymer film. For example, the flexible substrate 110 may include a material such as poly imide (PI), poly (ethylene terephthalate) (PET), or polymethylmethacrylate (PMMA). The flexible substrate 110 may further include a conductive thin film such as gold (Au), InSnO2 Indium tin oxide (InSnO2, ITO), IZO, ZnO, or carbon nanotubes. This may vary depending on a design of the flexible pressure sensor 10 to be manufactured.

In the present specification, one direction parallel to a top surface of the flexible substrate 110 may be defined as a first direction D1, one direction that intersects the first direction D1 and is parallel to the top surface of the flexible substrate 110 may be defined as a second direction D2, and one direction perpendicular to a top surface of the flexible substrate 110 may be defined as a third direction D3.

The first electrodes 120, the second electrodes 130, the first lines 125, and the second lines 135 may be provided on the flexible substrate 110. The first electrodes 120 and the second electrodes 130 may overlap the second protrusion structures 130 to be described later in the third direction D3. The plurality of first electrodes 120 may share one first line 125. The same voltage may be applied to the plurality of first electrodes 120 by the one first line 125. For example, a ground voltage may be applied to the plurality of first electrodes 120 through one first line 125.

Each of the second electrodes 130 may be connected to each of the second lines 135. Each of the second electrodes 130 may be independently connected by each of the second lines 135. That is, one second line 135 may be connected to one second electrode 130. Different voltages may be applied to the second electrodes 130 by the different second lines 135 connected to the second electrodes 130, respectively. Alternatively, the same voltage may be applied to the second electrodes 130. This may vary depending on a design of the flexible pressure sensor 10 to be manufactured.

The first electrodes 120 and the second electrodes 130 may be spaced apart from each other in the first direction D1 or the second direction D2. The first electrodes 120 and the second electrodes 130 may be alternately disposed in the first direction D1 or the second direction D2. The first lines 125 and the second lines 135 may not be electrically connected to each other.

Each of the first electrodes 120, the second electrodes 130, the first lines 125 and the second lines 135 may include a conductive metal material. Particularly, each of the first electrodes 120, the second electrodes 130, the first lines 125 and the second lines 135 may include copper.

Referring to FIGS. 1B and 2, the upper structure 200 may be provided on the lower structure 100. The upper structure 200 may include a support 210, first protrusion structures 220 and second protrusion structures 230. The support 210, the first protrusion structures 220, and the second protrusion structures 230 may be integrated with each other. The support 210, the first protrusion structures 220 and the second protrusion structures 230 may be provided separately from each other. The upper structure 200 including the support 210, the first protrusion structures 220 and the second protrusion structures 230 may include an elastomer material.

When viewed in a plan view, the support 210 may have a circular or polygonal shape. The support 210 may vertically overlap the lower structure 100. The support 210 may have a thickness of about 50 μm to about 150 μm, but is not limited thereto.

The first protrusion structures 220 and the second protrusion structures 230 may protrude from the support 210 toward the lower structure 100. When viewed in the plan view, the first protrusion structures 220 may be spaced apart from each other in the first direction D1 or the second direction D2. When viewed in the plan view, the second protrusion structures 230 may be spaced apart from each other in the first direction D1 and the second direction D2. When viewed in a plan view, the first protrusion structures 220 may completely surround the second protrusion structures 230. That is, the first protrusion structures 220 may be disposed in both the first direction D1 and the second direction D2 by using the second protrusion structures 230 as a center. In other words, when viewed in the plan view, a line connecting the centers of the first protrusion structures 220 may have a polygonal shape. Although not shown, the line connecting the centers of the first protrusion structures 220 in the plan view may have a circular or elliptical shape.

When viewed in the plan view, the first electrodes 120 and the second electrodes 130 may be spaced apart from the first protrusion structures 220. When viewed in the plan view, one first electrode 120 and one second electrode 130 may overlap one or a plurality of second protrusion structures 230, respectively.

As illustrated in FIG. 2, the protective film 300 may cover top and side surfaces of the support 210 of the upper structure 200. The protective film 300 may extend to the side surface of the flexible substrate 110 of the lower structure 100. Alternatively, unlike the drawings, the protective film 300 may not cover the top surface of the support 210, but may cover the bottom surface and the side surface of the flexible substrate 110 of the lower structure 100 to extend up to a side surface of the support 210. This may vary depending on a design of the flexible pressure sensor 10 to be manufactured.

Figure 3A:
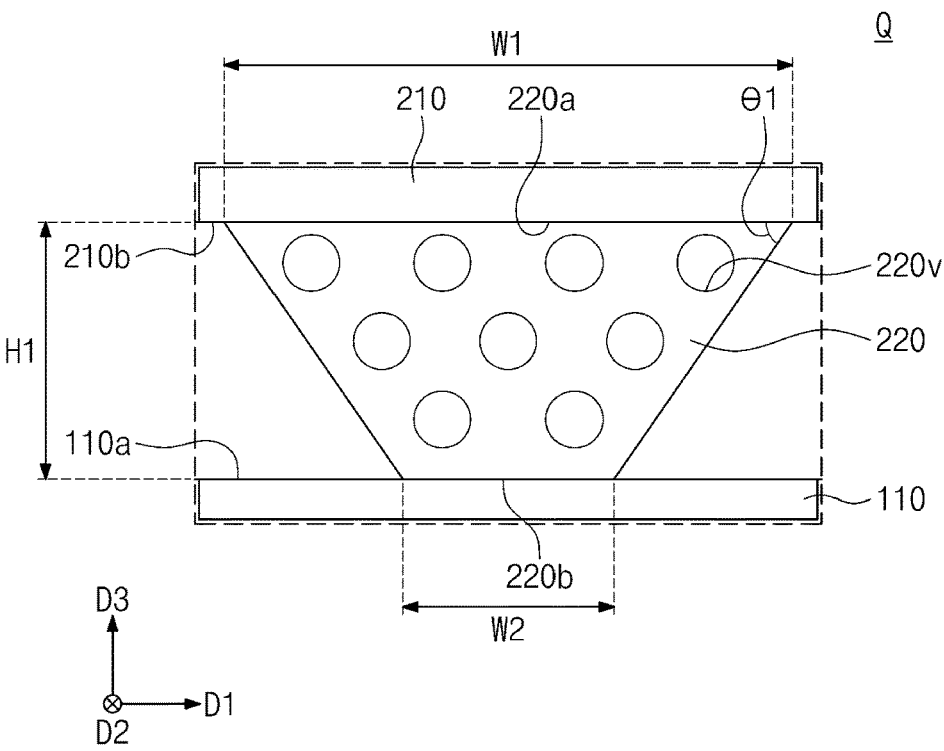
FIG. 3A is an enlarged view of a portion Q of FIG. 2.

FIG. 3A is an enlarged view of a portion Q of FIG. 2.

Referring to FIGS. 2 and 3A, each of the first protrusion structures 220 may include first pores 220v. The first pores 220v may be empty spaces or voids in the first protrusion structures 220. On the other hand, pores may not exist in the support 210.

A top surface 220a of the first protrusion structure 220 may have a first width W1 in the first direction D1. A bottom surface 220b of the first protrusion structure 220 may have a second width W2 in the first direction D1. The first width W1 may be greater than the second width W2. The first protrusion structure 220 may have a first height H1, and the first height H1 may correspond to a distance from the top surface 220a to the bottom surface 220b of the first protrusion structure 220 in the third direction D3. In other words, the first height H1 may be a vertical height of the first protrusion structure 220.

A width of the first protrusion structure 220 in the first direction D1 may gradually decrease at a constant rate from the top surface 220a to the bottom surface 220b of the first protrusion structure 220. When viewed in a cross-sectional view, the side surface of the first protrusion structure 220 may be inclined in the third direction D3. An angle between the top surface 220a and the side surface of the first protrusion structure 220 may be a first angle θ1. When viewed in the cross-sectional view, the first protrusion structure 220 may have a trapezoidal shape. When viewed in the plan view, each of the upper and bottom surfaces 220a and 220b of the first protrusion structure 220 may have a circular or polygonal shape.

The top surface 220a of the first protrusion structure 220 may be in contact with the bottom surface 210b of the support 210. The bottom surface 220b of the first protrusion structure 220 may be in contact with the top surface 110a of the flexible substrate 110.

The first pores 220v may have different diameters or different widths in the first direction D1. Each of the first pores 220v may have a diameter of about 1 μm to about 30 μm.

Figure 3B:
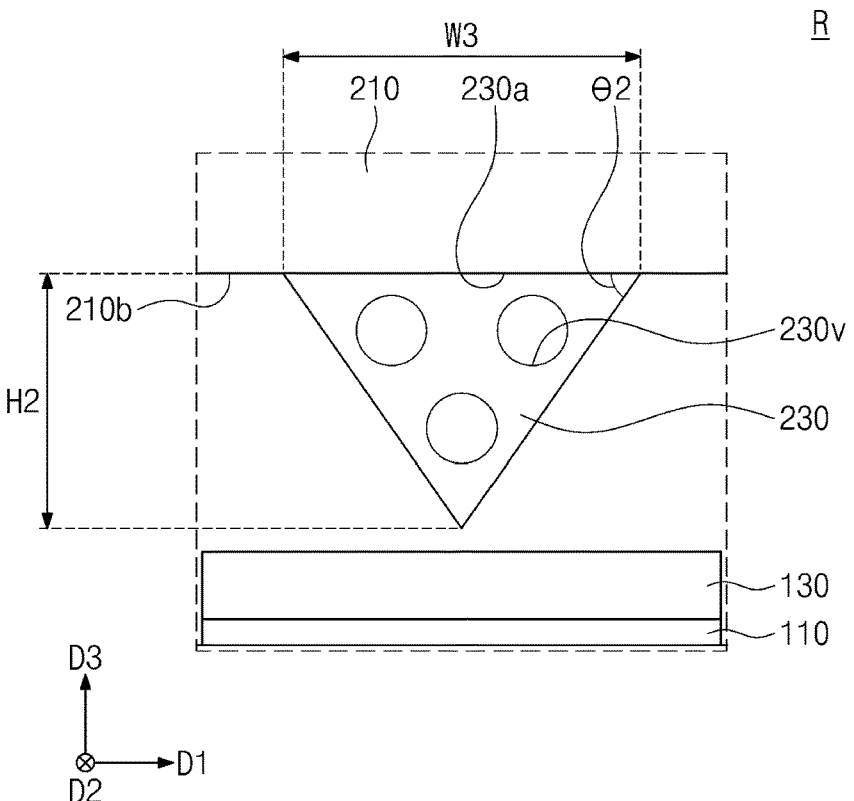
FIG. 3B is an enlarged view of a portion R of FIG. 2.

FIG. 3B is an enlarged view of a portion R of FIG. 2.

Referring to FIGS. 1B, 2, and 3B, the second protrusion structure 230 may include second pores 230v. The second pores 230v may be empty spaces or voids in the second protrusion structure 230.

The top surface 230a of the second protrusion structure 230 may have a third width W3 in the first direction D1. A width of the second protrusion structure 230 in the first direction D1 may gradually decrease at a constant rate from the top surface 230a to a lower side of the second protrusion structure 230. The lowermost end of the second protrusion structure 230 may have a pointed shape. When viewed in the cross-sectional view, the side surface of the second protrusion structure 230 may be inclined in the third direction D3. An angle between the top surface 230a and the side surface of the second protrusion structure 230 may be a second angle θ2. When viewed in the cross-sectional view, the second protrusion structure 230 may have a triangular shape. When viewed in the plan view, the top surface 220a of the second protrusion structure 230 may have a circular or polygonal shape. When viewed three-dimensionally, the second protrusion structure 230 may have a cone or polygonal pyramid shape. The second protrusion structure 230 may have a second height H2. The second height H2 may correspond to a distance from the top surface 230a of the second protrusion structure 230 to the lowermost end in the third direction D3. In other words, the second height H2 may be a vertical height of the second protrusion structure 230.

The top surface 230a of the second protrusion structure 230 may be in contact with the bottom surface 210b of the support 210. The second protrusion structure 230 may be vertically spaced apart from the top surface 110a of the flexible substrate 110. The second protrusion structure 230 may be vertically spaced apart from the first electrode 120 and the second electrode 130.

The second pores 230v may have different diameters or different widths in the first direction D1. Each of the second pores 230v may have a diameter of about 1 μm to about 30 μm.

Referring to FIGS. 3A and 3B, the first height H1 may be about 1.8 times to about 2.2 times the second height H2. The first width W1 may be greater than the third width W3. The first angle θ1 and the second angle θ2 may be substantially the same. Each of the first angle θ1 and the second angle θ2 may be about 52 degrees to about 57 degrees. Particularly, each of the first angle θ1 and the second angle θ2 may be about 54.7 degrees. The top surface 220a of the first protrusion structure 220 and the top surface 230a of the second protrusion structure 230 may be coplanar with each other. A level of the bottom surface 220b of the first protrusion structure 220 may be lower than that of the lowermost end of the second protrusion structure 230.

Figure 4:
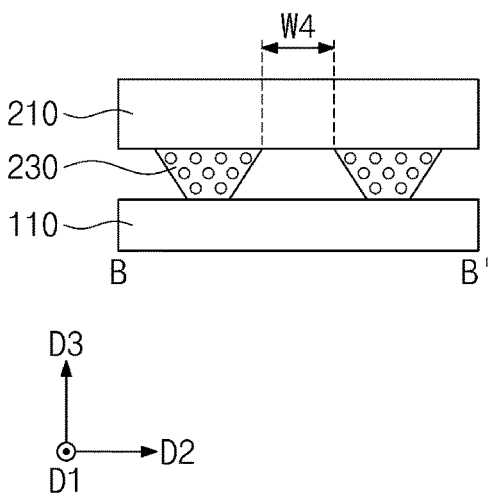
FIG. 4 is a cross-sectional view taken along line B-B' of FIG. 1B.

FIG. 4 is a cross-sectional view taken along line B-B' of FIG. 1B.

Referring to FIGS. 1B and 4, a distance between the first protrusion structures 220, which are adjacent to each other, in the first direction D1 or the second direction D2 may be a fourth width W4 when viewed in the plan view. The fourth width W4 may be the same between any adjacent first protrusion structures 220. The fourth width W4 may be less than the first width W1. The fourth width W4 may be about 0.5 times to about 0.7 times the first width W1.

When viewed in the plan view, a distance between the second protrusion structures 230, which are adjacent to each other, in the first direction D1 or the second direction D2 may be constant. A distance between the second protrusion structures 230, which are adjacent to each other, in the first direction D1 or the second direction D2 may be less than the fourth width W4.

Figure 5:
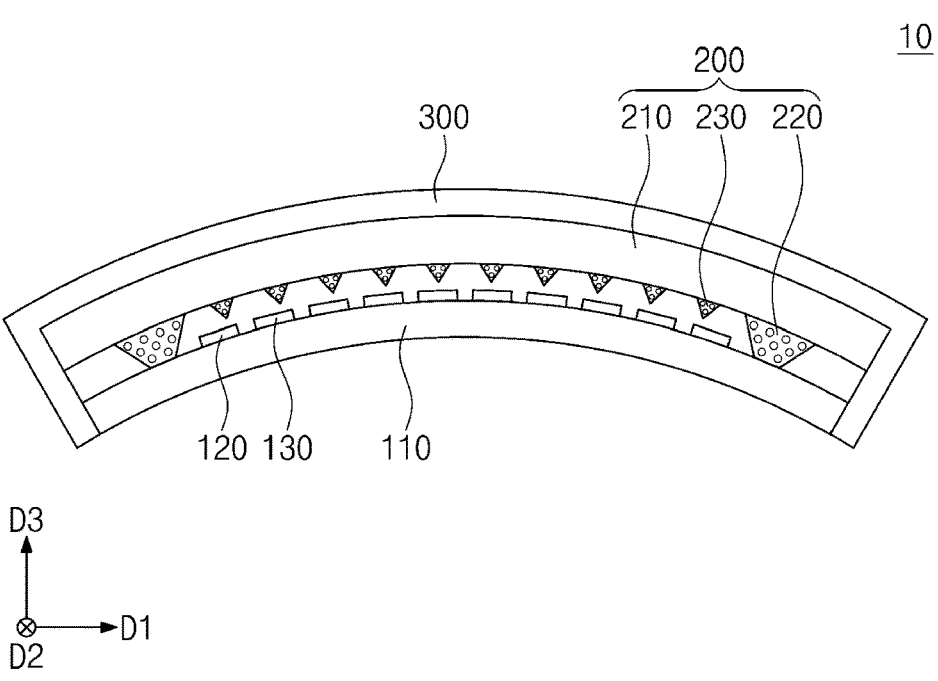
FIG. 5 is a cross-sectional view for explaining an operation principle of the flexible pressure sensor according to an embodiment of the inventive concept.

FIG. 5 is a cross-sectional view for explaining an operation principle of the flexible pressure sensor according to an embodiment of the inventive concept.

Referring to FIGS. 1B, 2, 3A, 3B and 5, in the flexible pressure sensor 10 according to the concept of the inventive concept, the first height H1 of the first protrusion structure 220 may be greater than the second height H2 of the second protrusion structure 230. In addition, the first width W1 of the top surface 220a of the first protrusion structure 220 may be greater than the second width W2 of the bottom surface 220b of the first protrusion structure 220. That is, when viewed in the cross-sectional view, the first protrusion structure 220 may have a trapezoidal shape. The second protrusion structures 230 may be vertically spaced apart from the first and second electrodes 120 and 130. Therefore, as illustrated in FIG. 5, even when a bending pressure is applied to the flexible pressure sensor 10 so that the flexible pressure sensor 10 is convexly deformed in the third direction D3, the second protrusion structures 230 may not be in contact with the first and second electrodes 120 and 130.

Although not shown, when a vertical pressure in the third direction D3 is applied to the flexible pressure sensor 10 in FIG. 2, the second protrusion structures 230 and the first and second electrodes 120 and 130 may be in contact with each other. In this case, the first electrodes 120 and the second electrodes 130 are electrically connected to each other by the upper structure 200 including the second protrusion structures 230, and thus, the flexible pressure sensor 10 may recognize the corresponding pressure. That is, the flexible pressure sensor 10 may not sense a pressure due to bending, but may selectively sense only a vertical pressure due to contact. In other words, the flexible pressure sensor 10 according to the inventive concept may prevent the pressure due to the bending from being sensed.

Figure 6:
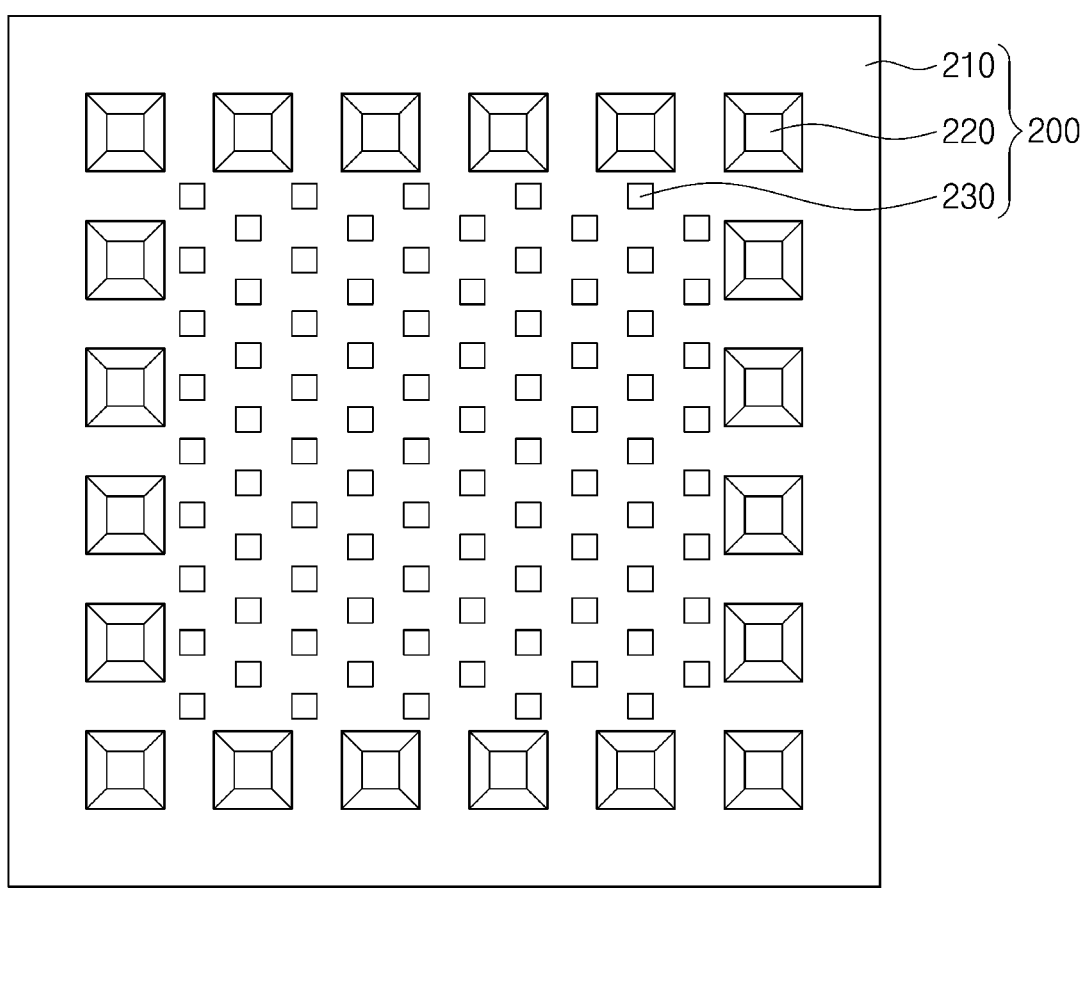
FIG. 6 is a plan view illustrating an upper structure of a flexible pressure sensor according to some embodiments.

FIG. 6 is a plan view illustrating an upper structure of a flexible pressure sensor according to some embodiments. Hereinafter, for convenience of description, descriptions of substantially the same items as those described with reference to FIGS. 1A, 1B, and 2 will be omitted, and differences will be described in detail.

Referring to FIG. 6, an arrangement of second protrusion structures 230 may be changed in a plan view. For example, when viewed in the plan view, the second protrusion structures 230 may be arranged in a zigzag shape in the first direction D1. The second protrusion structures 230 may have a periodic arrangement in the first direction D1 or the second direction D2.

Figure 7:
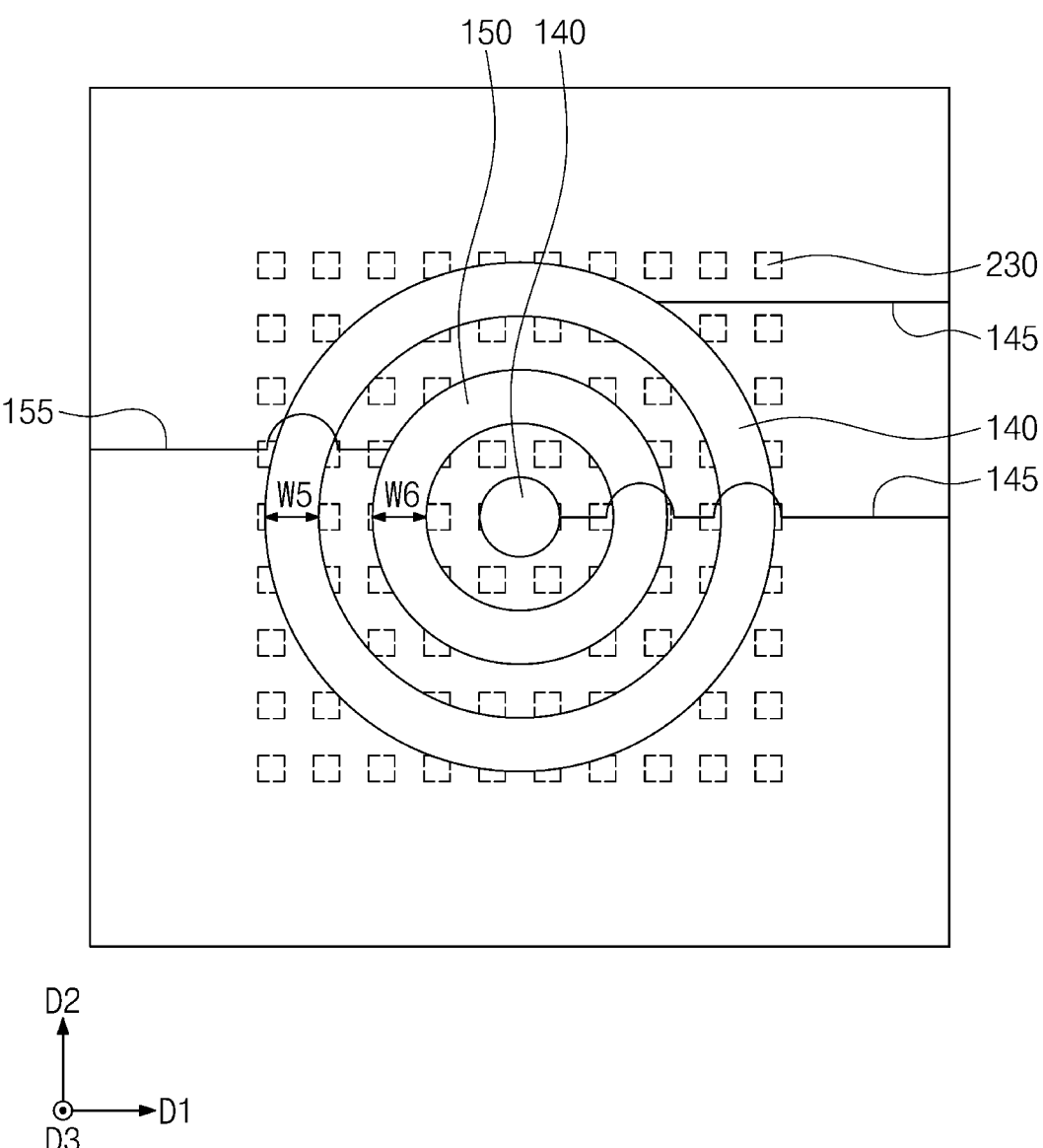
FIG. 7 is a plan view illustrating a lower structure of the flexible pressure sensor according to some embodiment.

FIG. 7 is a plan view illustrating the lower structure of the flexible pressure sensor according to some embodiment of the inventive concept. Hereinafter, for convenience of description, descriptions of substantially the same items as those described with reference to FIGS. 1A, 1B, and 2 will be omitted, and differences will be described in detail.

Referring to FIGS. 1A and 7, third electrodes 140 and fourth electrodes 150 may be provided instead of the first electrodes 120 and the second electrodes 130. Third lines 145 and fourth lines 155 may be provided instead of the first lines 125 and the second lines 135.

When viewed in the plan view, the third electrodes 140 and the fourth electrodes 150 may have a concentric circle shape. The third electrodes 140 and the fourth electrodes 150 may be alternately disposed from a center of the circular third electrode 140 in the first direction D1 or the second direction D2. Except for the circular third electrode 140 that is disposed at an intermediate portion, each of the third electrodes 140 may have a fifth width W5 between an outer perimeter and an inner perimeter. Each of the fourth electrodes 150 may have a sixth width W6 between the outer perimeter and an inner perimeter. The fifth width W5 and the sixth width W6 may be the same as or different from each other. This may vary depending on a design of the flexible pressure sensor 10 to be manufactured.

When viewed in the plan view, the third electrodes 140 and the fourth electrodes 150 may overlap each of the plurality of second protrusion structures 230.

The third electrodes 140 may be connected to the third lines 145. A ground voltage may be applied to the third lines 145. The fourth electrodes 150 may be connected to the fourth lines 155. A voltage different in magnitude from the voltage applied to the third lines 145 may be applied to the fourth lines 155.

The third electrodes 140 and the fourth electrodes 150 may be spaced apart from each other. The third lines 145 and the fourth lines 155 may be spaced apart from each other. Thus, if there is no external pressure, the third electrodes 140 and the fourth electrodes 150 may not be electrically connected to each other.

Figure 8:
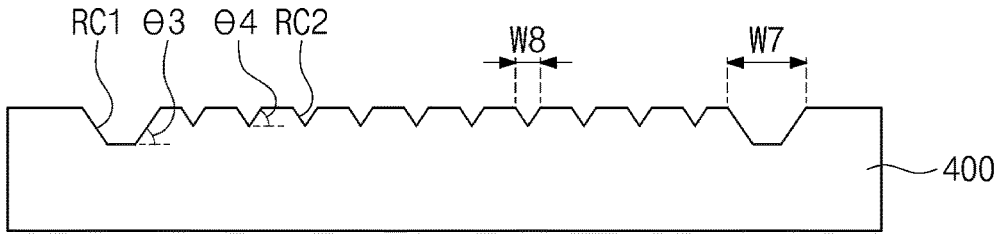
FIG. 8, FIG. 9 and FIG. 10 are cross-sectional views for explaining a method of manufacturing a flexible pressure sensor according to an embodiment of the inventive concept.
Figure 8:
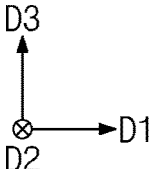
Figure 9:
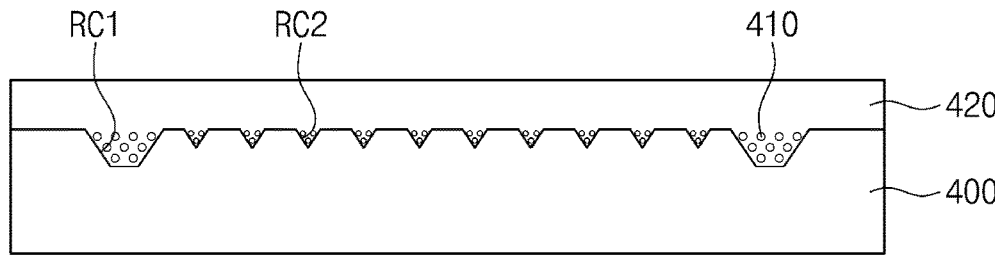
Figure 9:
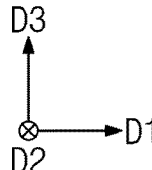
Figure 10:
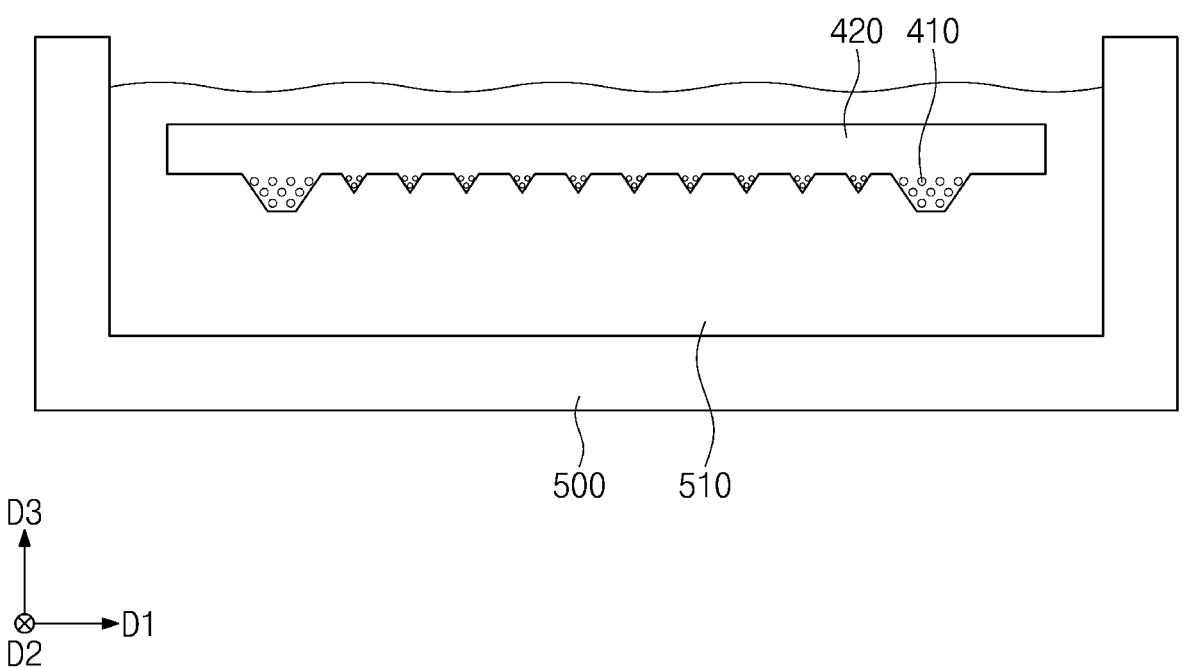

FIGS. 8 to 10 are cross-sectional views for explaining a method of manufacturing a flexible pressure sensor according to an embodiment of the inventive concept.

Referring to FIG. 8, a wafer substrate 400 may be provided. The wafer substrate 400 may include a silicon (Si) single crystal. A top surface of the wafer substrate 400 may include a <100> plane. A metal mask film (not shown) may be formed on the wafer substrate 400, and then, a wet etching process may be performed. A KOH material may be used in the wet etching process. Due to the etching characteristics of KOH, the wafer substrate 400 may be etched along the <110> plane during the wet etching process. Due to the wet etching process, a first recess RC1 and a second recess RC2 may be formed in the top surface of the wafer substrate 400. A width of each of the first and second recesses RC1 and RC2 may decrease from the top surface to the bottom surface of the wafer substrate 400. The first recess RC1 may have a seventh width W7 on the top surface of the wafer substrate 400. The second recess RC2 may have an eighth width W8 on the top surface of the wafer substrate 400. The seventh width W7 may be adjusted to form a first protrusion structure 220 having the first width W1 in FIG. 3A. The eighth width W8 may be adjusted to form a second protrusion structure 230 having the third width W3 in FIG. 3B. For example, the seventh width W7 may be substantially the same as the first width W1 of FIG. 3A. For example, the eighth width W8 may be substantially the same as the third width W3 of FIG. 3B.

A vertical depth of the first recess RC1 may be greater than a vertical depth of the second recess RC2. An angle between a bottom surface of the first recess RC1 and a side surface of the first recess RC1 may be a third angle $\theta 3$. The third angle $\theta 3$ may be adjusted to form the first protrusion structure 220 having the first angle $\theta 1$ of FIG. 3A. An angle between the bottom surface of the second recess RC2 and the side surface of the second recess RC2 may be a fourth angle $\theta 4$. The fourth angle $\theta 4$ may be adjusted to form the second protrusion structure 230 having the second angle $\theta 2$ of FIG. 3B. For example, the third angle $\theta 3$ may be substantially the same as the first angle $\theta 1$. For example, the fourth angle $\theta 4$ may be substantially the same as the second angle $\theta 2$. The third angle $\theta 3$ and the fourth angle $\theta 4$ may be about 52 degrees and about 57 degrees. Particularly, each of the third angle $\theta 3$ and the fourth angle $\theta 4$ may be about 54.7 degrees. Each of the third angle $\theta 3$ and the fourth angle $\theta 4$ may be an angle defined by the <100> plane and the <110> plane of the wafer substrate 400.

Referring to FIG. 9, an elastomer solution 420 may be provided on the wafer substrate 400. The elastomer solution 420 may be filled into a space formed by the first recess RC1 and the second recess RC2. A top surface of the elastomer solution 420 may be formed higher than the top surface of the wafer substrate 400. The elastomer solution 420 may be formed using a spin coating method. The elastomer solution 420 may include the same material as the upper structure 200. The elastomer solution 420 may include, for example, an elastomer material.

Before forming the elastomer solution 420, a micro bead 410 may be disposed in a space surrounded by the first recess RC1 and a space surrounded by the second recess RC2 of the wafer substrate 400. The micro bead 410 may exist in the elastomer solution 420 only in the space surrounded by the first recess RC1 and the space surrounded by the second recess RC2. The micro beads 410 may include, for example, a polystyrene material.

Thereafter, the elastomer solution 420 including the micro bead 410 may be cured by heating.

According to the inventive concept, the first protrusion structures 220 and the second protrusion structures 230 in FIGS. 3A and 3B may have first pores 220v and second pores 230v, respectively. On the other hand, the support 210 may not have pores. In addition, a size of the micro bead 410 in FIG. 9 may be adjusted to freely adjust porosity of the first pores 220v and the second pores 230v in FIGS. 3A and 3B. Thus, since a size of a minimum pressure that is capable of being sensed by the flexible pressure sensor 10 of FIG. 2 may be adjusted. As a result, reliability of the flexible pressure sensor 10 may be improved.

Referring to FIG. 10, the wafer substrate 400 may be removed, and the elastomer solution 420 containing the micro bead 410 may be placed in a bath 500 containing a sonicated solution 510. The sonicated solution 510 may include, for example, a toluene solution. Thereafter, a sonication process may be performed on the elastomer solution 420 and the micro bead 410. Due to the sonication process, the micro bead 410 in the cured elastomer solution 420 may be decomposed and removed. As a result, pores may be formed in the place in which the micro bead 410 is disposed in the elastomer solution 420. The pores may be the first pores 220v and the second pores 230v of FIGS. 3A and 3B. Thus, the upper structure 200 in FIG. 2 may be manufactured.

Referring back to FIG. 2, the upper structure 200 manufactured in FIG. may be coupled to the lower structure including the flexible substrate 110, the first electrodes 120, the second electrodes 130, the first lines 125, and the second lines 135. Then, a protective film 300 covering the lower structure 100 and upper structure 200, which are coupled to each other, may be formed. Thus, the flexible pressure sensor 10 may be formed.

Figure 11:
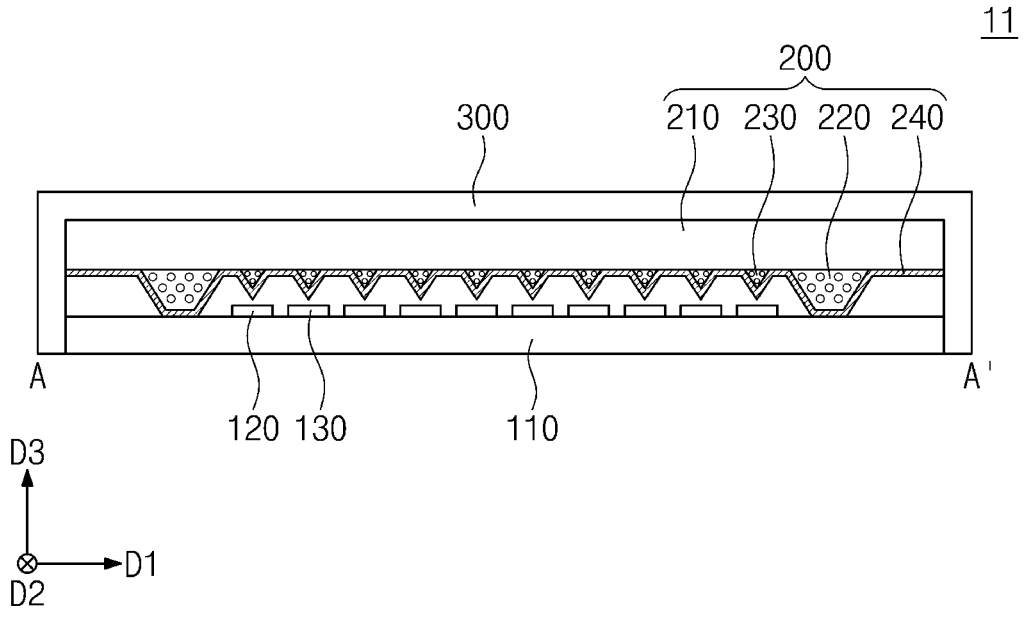
FIG. 11 is a cross-sectional view for explaining the flexible pressure sensor according to some embodiments, which corresponds to a cross-section taken along line A-A' of FIGS. 1A and 1B.

FIG. 11 is a cross-sectional view for explaining the flexible pressure sensor according to an embodiment of the inventive concept, which corresponds to a cross-section taken along line A-A' of FIGS. 1A and 1B. Hereinafter, for convenience of description, descriptions of substantially the same items as those described with reference to FIGS. 1A, 1B, and 2 will be omitted, and differences will be described in detail.

Referring to FIG. 11, the upper structure 200 of the flexible pressure sensor 11 may further include a conductive film 240. The conductive film 240 may cover the bottom surface of the support 210, side surfaces and bottom surfaces of the first protrusion structures 220, and side surfaces of the second protrusion structures 230. The conductive film 240 may extend in the first direction D1 and the second direction D2. The conductive film 240 may be in contact with the top surface of the flexible substrate 110 on a region that vertically overlaps the first protrusion structures 220. The conductive film 240 may be vertically spaced apart from the first electrodes 120 and the second electrodes 130. A side surface of the conductive film 240 may be in contact with the protective film 300, but is not limited thereto. The conductive film 240 may include a conductive polymer. For example, the conductive film 240 may include pyrrole coupled to a silane group. In this case, the support 210, each of the first protrusion structures, and the second protrusion structures of the upper structure may include an non-conductivity elastomer.

According to the configuration of the inventive concept, in the flexible pressure sensor 10, the first height of the first protrusion structure may be greater than the second height of the second protrusion structure. In addition, the first width of the top surface of the first protrusion structure may be greater than the second width of the bottom surface of the first protrusion structure. That is, in terms of the cross-sectional region, the first protrusion structure may have the trapezoidal shape. The second protrusion structures may be vertically spaced apart from the first and second electrodes under the second protrusion structure. In addition, the first protrusion structures may completely surround the second protrusion structures. Therefore, even when the flexible pressure sensor is convexly deformed due to the bending pressure applied to the flexible pressure sensor, the second protrusion structures may not be in contact with the first and second electrodes. As a result, the flexible pressure sensor may minimize the pressure sensing due to the bending, but may selectively sense only the pressure due to the contact.

Although the embodiment of the inventive concept is described with reference to the accompanying drawings, those with ordinary skill in the technical field of the inventive concept pertains will be understood that the present disclosure can be carried out in other specific forms without changing the technical idea or essential features. Therefore, the above-disclosed embodiments are to be considered illustrative and not restrictive.

What is claimed is:

1. A flexible pressure sensor comprising:
a lower structure; and
an upper structure on the lower structure,
wherein the lower structure comprises:
    a flexible substrate; and
    first electrodes on the flexible substrate and second electrodes spaced apart from the first electrodes, and
the upper structure comprises:
    a support;
    first protrusion structures integrally connected to the support to protrude from a bottom surface of the support; and
    second protrusion structures integrally connected to the support to protrude from the bottom surface of the support, the second protrusion structures being spaced apart from the first protrusion structures,
wherein the second protrusion structures vertically overlap the first and second electrodes,
the first protrusion structures are in contact with a top surface of the flexible substrate,
the second protrusion structures are vertically spaced apart from the first and second electrodes, and
when viewed in a plan view, the first protrusion structures are configured to completely surround the second protrusion structures.

2. The flexible pressure sensor of claim 1, wherein each of the first protrusion structures has a first height, and
each of the second protrusion structures has a second height,
wherein the first height is greater than the second height.

3. The flexible pressure sensor of claim 2, wherein the first height is about 1.8 times to about 2.2 times the second height.

4. The flexible pressure sensor of claim 1, wherein each of the first protrusion structures and each of the second protrusion structures comprise pores, respectively.

5. The flexible pressure sensor of claim 4, wherein the support does not comprise the pores.

6. The flexible pressure sensor of claim 1, wherein a top surface of each of the first protrusion structures has a first width in a first direction, which is parallel to the top surface of the flexible substrate,
a bottom surface of each of the first protrusion structures has a second width in the first direction, and
a top surface of each of the second protrusion structures has a third width in the first direction,
wherein the first width is greater than each of the second width and the third width.

7. The flexible pressure sensor of claim 6, wherein a width of each of the first protrusion structures in the first direction decreases constantly from the top surface to the bottom surface of each of the first protrusion structures.

8. The flexible pressure sensor of claim 7, wherein a lower end of each of the second protrusion structures has a pointed shape.

9. The flexible pressure sensor of claim 1, further comprising first line connected to the first electrodes and second lines separately connected to each of the second electrodes,
wherein a ground voltage is applied to the first line, and
a bias voltage that is different in magnitude from the ground voltage is applied to the second lines.

10. The flexible pressure sensor of claim 1, wherein, when viewed in a plan view, the first electrodes and the second electrodes have a concentric circle shape.

11. The flexible pressure sensor of claim 1, further comprising a conductive film configured to cover the bottom surface of the support, the first protrusion structures, and the second protrusion structures,
wherein the conductive film is in contact with the flexible substrate on a region that vertically overlaps the first protrusion structures, and
the conductive film is vertically spaced apart from the first and second electrodes on a region that vertically overlaps the second protrusion structures.

12. The flexible pressure sensor of claim 1, wherein the first protrusion structures are configured to remain in contact with the top surface of the flexible substrate and the second protrusion structures are configured to remain vertically spaced apart from the first and second electrodes, when a bending pressure is applied to the flexible pressure sensor, and
wherein the first protrusion structures are configured to remain in contact with the top surface of the flexible substrate and the second protrusion structures are configured to selectively contact the first and second electrodes, when a vertical pressure is applied to the flexible pressure sensor.

13. A flexible pressure sensor comprising:
a lower structure; and
an upper structure on the lower structure,
wherein the lower structure comprises:
    a flexible substrate; and
    first electrodes on the flexible substrate and second electrodes spaced apart from the first electrodes, and
the upper structure comprises:
    a support;
    first protrusion structures protruding from a bottom surface of the support; and
    second protrusion structures protruding from the bottom surface of the support, the second protrusion structures being spaced apart from the first protrusion structures,
wherein each of the first protrusion structures has a first width in a first direction parallel to a top surface of the flexible substrate,
each of the second protrusion structures has a second width in the first direction,
the bottom surface of the support and a side surface of each of the first protrusion structures are angled at a first angle, and
the bottom surface of the support and a side surface of each of the second protrusion structures are angled at a second angle,
wherein the second protrusion structures vertically overlap the first and second electrodes,
the first protrusion structures are in contact with a top surface of the flexible substrate,
the second protrusion structures are vertically spaced apart from the first and second electrodes,
wherein the first width is greater than the second width, and the first angle and the second angle are the same.

14. The flexible pressure sensor of claim 13, wherein, when viewed in a cross-sectional view, each of the first protrusion structures has a trapezoidal shape, and
when viewed in a cross-sectional view, each of the second protrusion structures has a triangular shape.

15. The flexible pressure sensor of claim 13, wherein each of the first angle and the second angle ranges of about 52 degrees to about 57 degrees.

16. The flexible pressure sensor of claim 15, wherein each of the first protrusion structures has a first height, and each of the second protrusion structures has a second height, wherein the first height is 1.8 times to 2.2 times the second height.

17. The flexible pressure sensor of claim 13, wherein the first protrusion structures are configured to completely surround the second protrusion structures, and the second protrusion structures are arranged in a zigzag shape in the first direction.

* * * * *